US011586491B2

(12) United States Patent
Banerjee et al.

(10) Patent No.: US 11,586,491 B2
(45) Date of Patent: Feb. 21, 2023

(54) SERVICE ISSUE SOURCE IDENTIFICATION IN AN INTERCONNECTED ENVIRONMENT

(71) Applicant: International Business Machines Corporation, Armonk, NY (US)

(72) Inventors: Joydeep Banerjee, Round Rock, TX (US); Randall M George, Austin, TX (US); Edwin Onattu, Austin, TX (US); Taylor George, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/332,614

(22) Filed: May 27, 2021

(65) Prior Publication Data

US 2022/0382621 A1 Dec. 1, 2022

(51) Int. Cl.
*G06F 11/00* (2006.01)
*G06F 11/07* (2006.01)
*G06N 7/00* (2023.01)
*G06F 16/901* (2019.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 16/9024* (2019.01); *G06N 7/005* (2013.01)

(58) Field of Classification Search
CPC ............ G06F 11/0793; G06F 11/0709; G06F 11/0751; G06F 11/079; G06F 11/0706; G06F 11/0703; G06F 11/0754; G06F 11/076

See application file for complete search history.

(56) References Cited

U.S. PATENT DOCUMENTS

| | | | |
|---|---|---|---|
| 10,009,216 B2 | 6/2018 | Giammaria et al. |
| 10,318,366 B2 | 6/2019 | Qi et al. |
| 10,417,225 B2 | 9/2019 | Tankersley et al. |
| 10,474,680 B2 | 11/2019 | Ramani et al. |

(Continued)

FOREIGN PATENT DOCUMENTS

CA 2498065 C 3/2004

OTHER PUBLICATIONS

Brandon et al., Graph-based Root Cause Analysis for Service-Oriented and Microservice Architectures, Oct. 7, 2019.

(Continued)

*Primary Examiner* — Katherine Lin
(74) *Attorney, Agent, or Firm* — Garg Law Firm, PLLC; Rakesh Garg; Christopher Pignato

(57) ABSTRACT

A first service's exhibition of a first symptom while executing a set of transactions is detected. A graph is constructed representing data flow between a set of services including the first service. By traversing the graph, a set of candidate services is constructed, a candidate service in the set of candidate services comprising a service exhibiting the first symptom, the set of candidate services including the first service. A probability of a first cause is evaluated, for the candidate service. At a problem service in the set of candidate services, a problem cause is ameliorated, the problem service identified using the set of candidate services and the probability of the first cause, the problem cause causing the first symptom.

20 Claims, 9 Drawing Sheets

(56) References Cited

U.S. PATENT DOCUMENTS

| | | | |
|---|---|---|---|
| 10,503,348 B2 | 12/2019 | Maheshwari et al. | |
| 2016/0357859 A1* | 12/2016 | Agarwal | G06F 40/279 |
| 2017/0068747 A1 | 3/2017 | Qi et al. | |
| 2019/0266253 A1* | 8/2019 | Maiti | G06F 16/243 |
| 2022/0083883 A1* | 3/2022 | Devanathan | G06F 16/9024 |

OTHER PUBLICATIONS

Noel et al., CyGraph: Graph-Based Analytics and Visualization for Cybersecurity, Jan. 2016.

ip.com, Method and apparatus for improving network performance using Cognitive Framework, Mar. 1, 2019.

ip.com, A System and Method of System Anomaly Identification by Tracing Back KPI Anomaly Chain, Feb. 1, 2019.

\* cited by examiner

*Fig. 6*
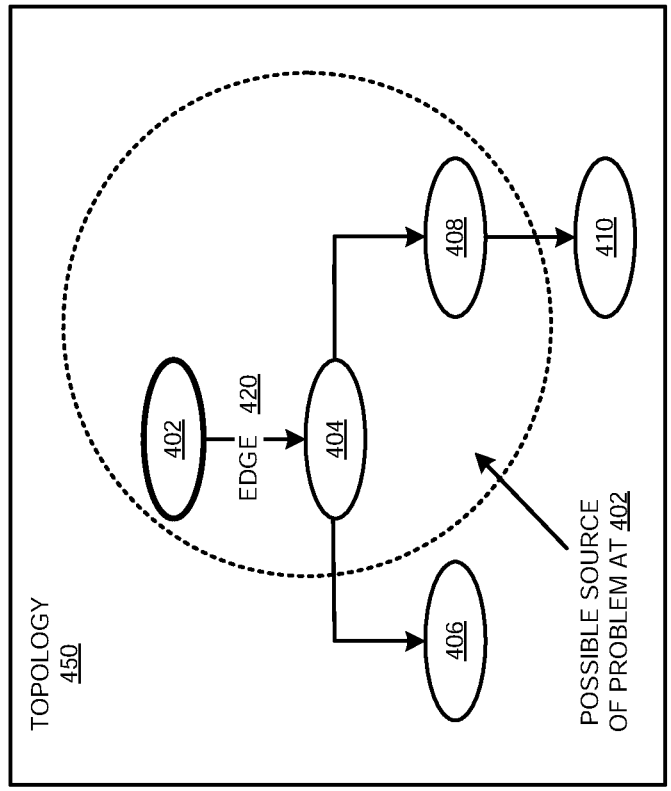
TABLE 460
| SERVICE | STATUS |
|---|---|
| 402 | LATENCY = TRUE |
| 404 | LATENCY = TRUE, SATURATION = TRUE, TRAFFIC = FALSE, PROBABILITY(DEPENDENCY) = 0.82 |
| 406 | NO SYMPTOMS |
| 408 | LATENCY = TRUE, SATURATION = TRUE, TRAFFIC = TRUE, PROBABILITY(DEPENDENCY) = 0.001 |
| 410 | NO SYMPTOMS |
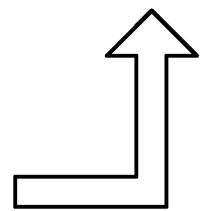

SERVICE ISSUE SOURCE IDENTIFICATION IN AN INTERCONNECTED ENVIRONMENT

BACKGROUND

The present invention relates generally to a method, system, and computer program product for service troubleshooting. More particularly, the present invention relates to a method, system, and computer program product for service issue source identification in an interconnected environment.

A service is a software application that processes transactions by communicating data, status, and execution commands over a network with other services or software applications. Dividing a large application into smaller services provides ease of scaling as demands on a portion of the application or available systems for service execution change.

An issue is a problem affecting one or more transactions a service provides to clients. For example, a system with a failing storage component might exhibit a higher-than-normal error rate when writing data to the storage component, necessitating a higher-than-normal retry rate for the affected data writes that slows the system's overall transaction processing. As another example, if a system is connected by two links, one faster than the other, to a network, but the faster link becomes unavailable due to a hardware failure, routing all the system's communications via the remaining, slower link might raise the system's response time for transactions involving data from other systems to an unacceptable level.

SUMMARY

The illustrative embodiments provide a method, system, and computer program product. An embodiment includes a method that detects that a first service is exhibiting a first symptom, the first symptom comprising a performance indicator measure with a value outside a predetermined range, the first service executing a set of transactions. An embodiment constructs a graph representing data flow between a set of services including the first service, a node of the graph representing a service in the set of services, an edge of the graph representing a data flow between two services in the set of services. An embodiment constructs, by traversing the graph, a set of candidate services, a candidate service in the set of candidate services comprising a service exhibiting the first symptom, the set of candidate services including the first service. An embodiment evaluates, for the candidate service, a probability of a first cause. An embodiment ameliorates, at a problem service in the set of candidate services, a problem cause, the problem service identified using the set of candidate services and the probability of the first cause, the problem cause causing the first symptom.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a continued example of service issue source identification in an interconnected environment in accordance with an illustrative embodiment;

DETAILED DESCRIPTION

Figure 1:
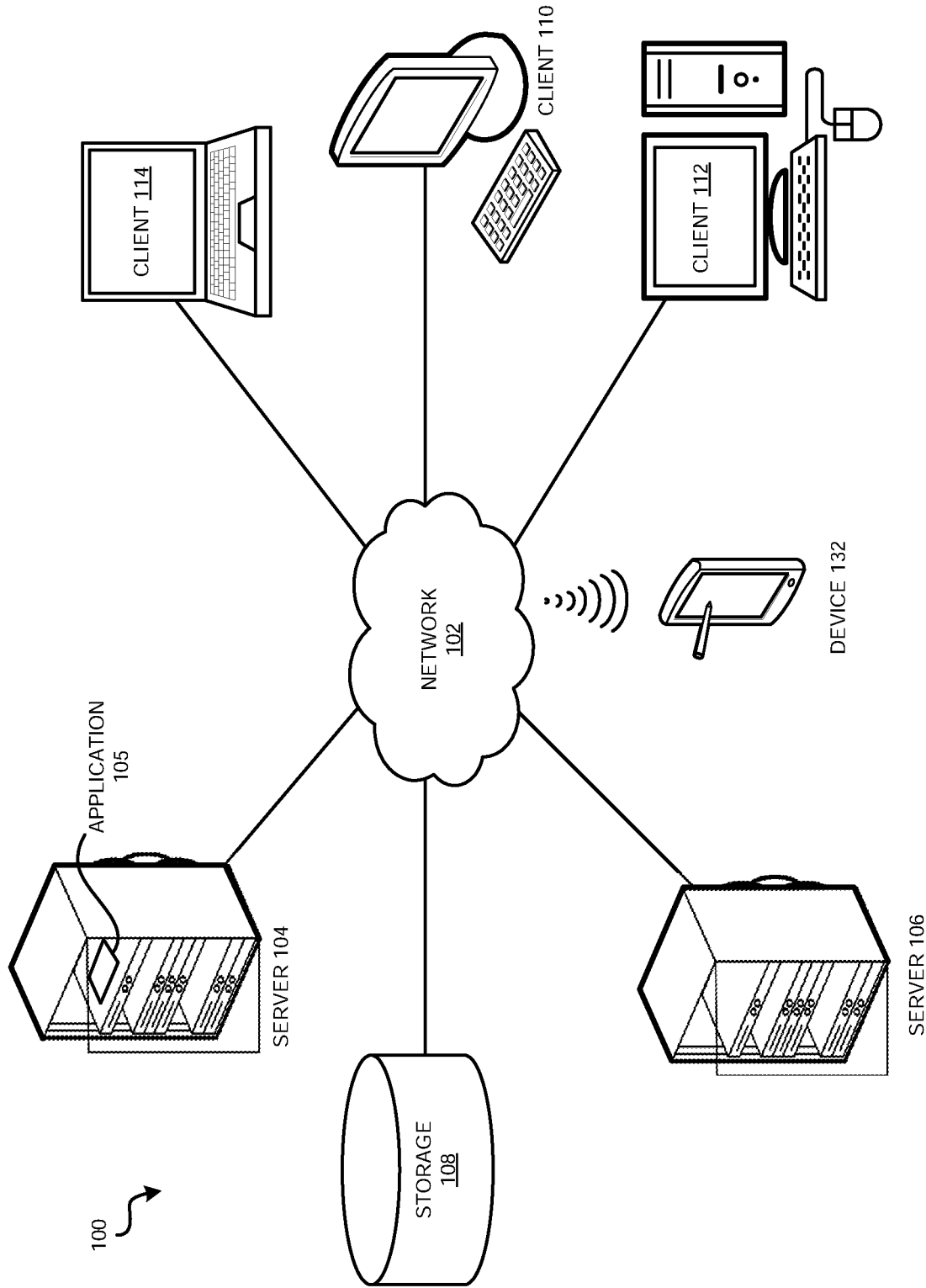
FIG. 1 depicts a block diagram of a network of data processing systems in which illustrative embodiments may be implemented.

The illustrative embodiments recognize that many service issues exhibit a symptom that is detectable using a performance measurement or performance indicator. For example, an error rate in a service's transaction handling and a latency, a measure of time delay experienced by a system, are both measurable. An error rate rising above a threshold value and a latency rising above a threshold value are both indicators that an issue is occurring.

The illustrative embodiments also recognize that, when a service is executing and interacting with other services in an interconnected environment such as a network, it can be difficult to identify a root cause from a performance measurement. One method of root cause identification involves using a presently-available tool to generate records tracing transactions and data flow within a network, then using the data to attempt to identify a service acting as a bottleneck. However, it is difficult to distinguish normal behavior for behavior related to a current issue. For example, a measurement of higher-than-a-threshold latency for a particular service might mean that the service has a failing component causing the latency, but the measurement might also be normal for that service. As well, analyzing data of multiple measurements, transactions, and services within a complex network is challenging.

The illustrative embodiments also recognize that identifying a particular service as causing a particular symptom is insufficient, because a symptom at one service might have a root cause elsewhere on the network. For example, a measurement of higher-than-a-threshold latency for a particular service might be due to a high latency at another service from which the first service pulls data. Thus, identifying the real root cause requires detailed knowledge of data flows between services on a network and how one service affects others.

Thus, the illustrative embodiments recognize that there is an unmet need to identify a symptom via performance measurements, isolate a root cause of the symptom to one or a small group of services, and ameliorate the cause of the symptom. The illustrative embodiments recognize that the presently available tools or solutions do not address these needs or provide adequate solutions for these needs. The illustrative embodiments used to describe the invention generally address and solve the above-described problems and other problems related to service issue source identification in an interconnected environment.

An embodiment can be implemented as a software application. The application implementing an embodiment can be configured as a modification of an existing service management system, as a separate application that operates in conjunction with an existing service management system, a standalone application, or some combination thereof.

Particularly, some illustrative embodiments provide a method that detects that a first service is exhibiting a first symptom, constructs a graph representing data flow between a set of services including the first service, constructs, by traversing the graph, a set of candidate services, evaluates, for the candidate service, a probability of a first cause, and ameliorates, at a problem service in the set of candidate services, a problem cause causing the first symptom.

An embodiment detects that a service is exhibiting a symptom. A symptom is a performance indicator with a value outside a predetermined range. A performance indicator, or key performance indicator, measures performance of a particular computer system characteristic. Some non-limiting examples of performance indicators are an error rate, latency time (a time delay before a data transfer begins following an instruction to perform the transfer), and traffic rate (a number of messages or number of bytes of data passing through a service within a time period).

One embodiment monitors a set of performance indicators of one or more executing services and the systems on which services execute, and generates an alert when one or more of the monitored performance indicators is outside a predetermined normal range. Another embodiment generates an alert when one or more of the monitored performance indicators is outside a predetermined normal range for more than a predetermined amount of time, to avoid generating spurious alerts if a performance indicator is only briefly outside the normal range. For example, the embodiment might generate an alert when a latency time rises above a predetermined threshold, or when traffic rate remains below the lower end of a predetermined range for more than ten minutes. Another embodiment receives an alert from a separate performance monitoring application that monitors a set of performance indicators of services and systems and generates an alert when one or more of the monitored performance indicators is outside a predetermined normal range. In one embodiment, the set of performance indicators includes only an error rate and latency time of a service. Another embodiment groups multiple performance indicators together into an error rate group or a latency group by normalizing individual performance indicator values to a common scale and combining them using an average, weighted average, or other presently available combining technique. For example, one performance indicator might measure latency when uploading files, while another performance indicator might measure latency in website response time. To combine them, one embodiment normalizes each measure to a common percentage scale and averages them, resulting in a combined latency measure (a percentage) that can be compared to one predetermined threshold (e.g. alert when the combined latency measure is above 75%).

An embodiment constructs a graph representing data flow between a set of services including the service exhibiting the symptom. Each node of the graph represents a service, and edges of the graph represent a data flow between two services. For example, if service A is exhibiting a higher-than-threshold error rate, and service A only communicates data with service B, the resulting graph includes two nodes, one each for service A and service B, connected by an edge representing the data flow between the two services. One embodiment constructs a graph based on observed data flow during a single transaction, for example a transaction that was occurring when the embodiment detected the symptom. Another embodiment constructs a graph based on observed data flow during multiple transactions, for example including a transaction that was occurring when the embodiment detected the symptom. Another embodiment models data flow between the set of services using a topology other than a graph, or using a different data representation. Techniques for constructing the graph or other representation using observed data flows within a network are presently available.

An embodiment constructs a set of one or more candidate services, which are services that might be causing the original detected symptom. For example, if service A is exhibiting a latency above a threshold value, the root cause of this high latency might be within service A, but might also be within service D, which services data requests from service A. The root cause of this high latency might also be elsewhere in the network, such as at service G which services data requests from service D.

To construct a set of one or more candidate services, an embodiment traverses the graph or other data flow representation. At each service the embodiment encounters during traversal (i.e., each node of the graph), the embodiment determines from one or more performance indicators of the service, whether or not this service is also exhibiting a performance indicator with a value outside a predetermined range. If so, the embodiment adds the service to the set of candidate services, and sets a flag corresponding to each abnormal performance indicator in a data structure of each candidate service. One embodiment traverses the graph using a breadth first search technique, starting from the service exhibiting the symptom and proceeding until encountering a node without that particular symptom. Other embodiments use other traversal techniques, which are presently known.

An embodiment evaluates a probability of a cause corresponding to a symptom exhibited at a candidate service. One embodiment evaluates a probability of a cause corresponding to a symptom exhibited at every candidate service. To perform the evaluation, one embodiment uses a Bayesian Belief Network (BBN). A BBN, also known as a Bayesian network, Bayes network, belief network, or decision network, is a probabilistic graphical model that represents a set of variables and their conditional dependencies with a directed acyclic graph. Edges in the graph represent conditional dependencies. Each node has a corresponding a probability function that takes, as input, a set of values of the node's parent variables, and computes a probability of the variable represented by the node given the input set of values. Nodes that do not have a path connecting each other represent variables that are conditionally independent of each other.

An embodiment constructs the BBN using a combination of subject domain knowledge and historical data of the services on the network. In one embodiment, a human expert selects nodes of the BBN, and the embodiment learns the corresponding probabilities by analyzing historical data of the services and their network. Another embodiment analyzes historical data of the services and their network to determine both nodes and probabilities. Techniques for analyzing historical data to determine nodes, probabilities, or both are presently available.

One embodiment uses a BBN with nodes representing error rate, latency, changes in application code or service configuration, saturation, traffic, and a dependency problem. Each node has two possible values, true and false, indicating whether or not a phenomenon represented by a node is currently occurring. Thus, if a service has a performance indicator such as error rate, latency, or traffic outside a predetermined range, the corresponding node's value is set to true; otherwise the node's value is set to false. If a service is exhibiting saturation (i.e., the service is being asked to transmit or receive more data in a given time than the service is capable of processing), the saturation node's value is set to true; otherwise, the saturation node's value is set to false. If a service has undergone a change in application code or service configuration within a predetermined time, or a change of a size or complexity above a predetermined threshold within a predetermined time, the change node's value is set to true; otherwise, the change node's value is set to false. If a service has a dependency problem (i.e., the service is dependent on another service which is exhibiting a symptom), the dependency problem node's value is set to true; otherwise, the dependency problem node's value is set to false. Thus, the embodiment evaluates a probability of one node's variable being true, given values of one or more other nodes.

For example, consider service D, a candidate service that an embodiment has determined is exhibiting two symptoms: latency is higher than a threshold value and saturation is higher than a threshold value. However, service D is exhibiting a normal (within a predetermined range) traffic rate. Representing latency, saturation, and traffic as binary values, an embodiment uses a BBN to compute a probability that, given input variables latency=true, saturation=true, and traffic=false, service D has a dependency problem (i.e., a binary value for a dependency variable=true) causing the observed symptoms. Similarly, consider service G, a candidate service with latency=true, saturation=true, and traffic above a predetermined threshold and hence true as well. Thus, the embodiment uses the same BBN to compute a probability that, given input variables latency=true, saturation=true, and traffic=true, service G has a dependency problem causing the observed symptoms.

An embodiment uses the identified symptoms and any cause probabilities to identify one or more candidate services which could be the source of the original detected symptom. One embodiment identifies the set of candidate services, along with their symptoms and cause probabilities, for a human expert to use to perform further analysis. Another embodiment ranks the set of candidate services according to a probability of being the problem service, and presents the ranking, along with their symptoms and cause probabilities, to a human expert.

Another embodiment ranks the set of candidate services according to a probability of being the problem service, and selects a service as the problem service without input from a human expert. For example, consider the set of candidate services consisting of service D and service G, both exhibiting latency and saturation symptoms. Service D is also exhibiting a traffic symptom, but service G is not. From the graph, the embodiment has determined that service D is dependent on service G. Additionally, from the BBN the embodiment has determined that there is an 82% probability that, given its symptoms, service D has a dependency problem and there is a 0.1% probability that, given its symptoms, service G has a dependency problem. Thus, there is an 82% probability that service D's problem is due to its dependency on service G, and an 18% probability that service D's problem is due to itself. As well, there is a 0.1% probability that service G's problem is due to its dependency on another service, and a 99.9% probability that service G's problem is due to itself. Thus, within this set of candidate services, the root cause of the issue with service D is likely to be at service G.

An embodiment reconfigures the problem service, ameliorating the cause of the detected symptom. Another embodiment reports the problem service to a human expert for verification and amelioration.

The manner of service issue source identification in an interconnected environment described herein is unavailable in the presently available methods in the technological field of endeavor pertaining to computer system management. A method of an embodiment described herein, when implemented to execute on a device or data processing system, comprises substantial advancement of the functionality of that device or data processing system in detecting that a first service is exhibiting a first symptom, constructing a graph representing data flow between a set of services including the first service, constructing, by traversing the graph, a set of candidate services, evaluating, for the candidate service, a probability of a first cause, and ameliorating, at a problem service in the set of candidate services, a problem cause causing the first symptom.

The illustrative embodiments are described with respect to certain types of performance indicators, measurements, thresholds, symptoms, causes of symptoms, services, graphs, topologies, rankings, adjustments, sensors, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
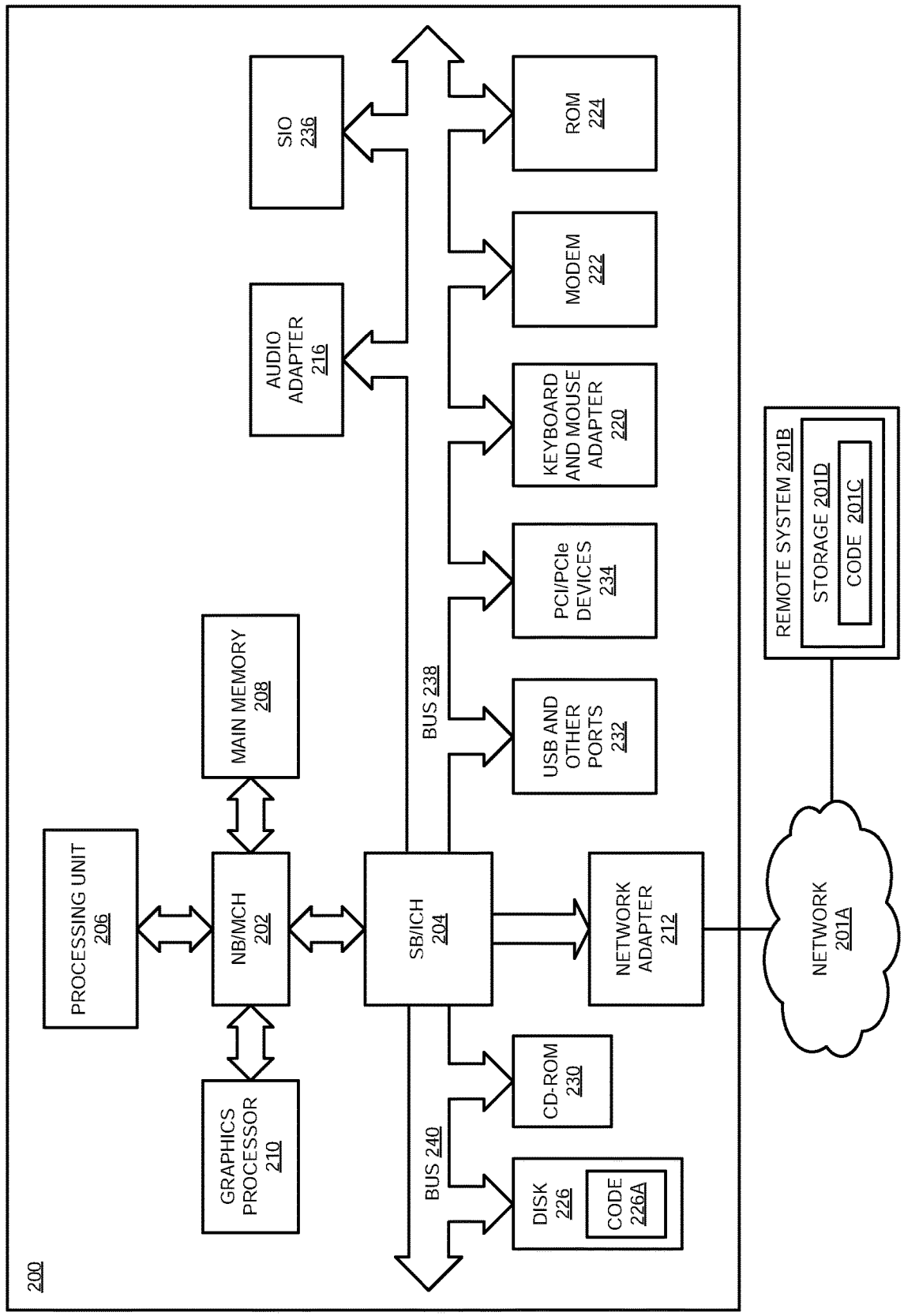
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132, and manages services executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/ output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
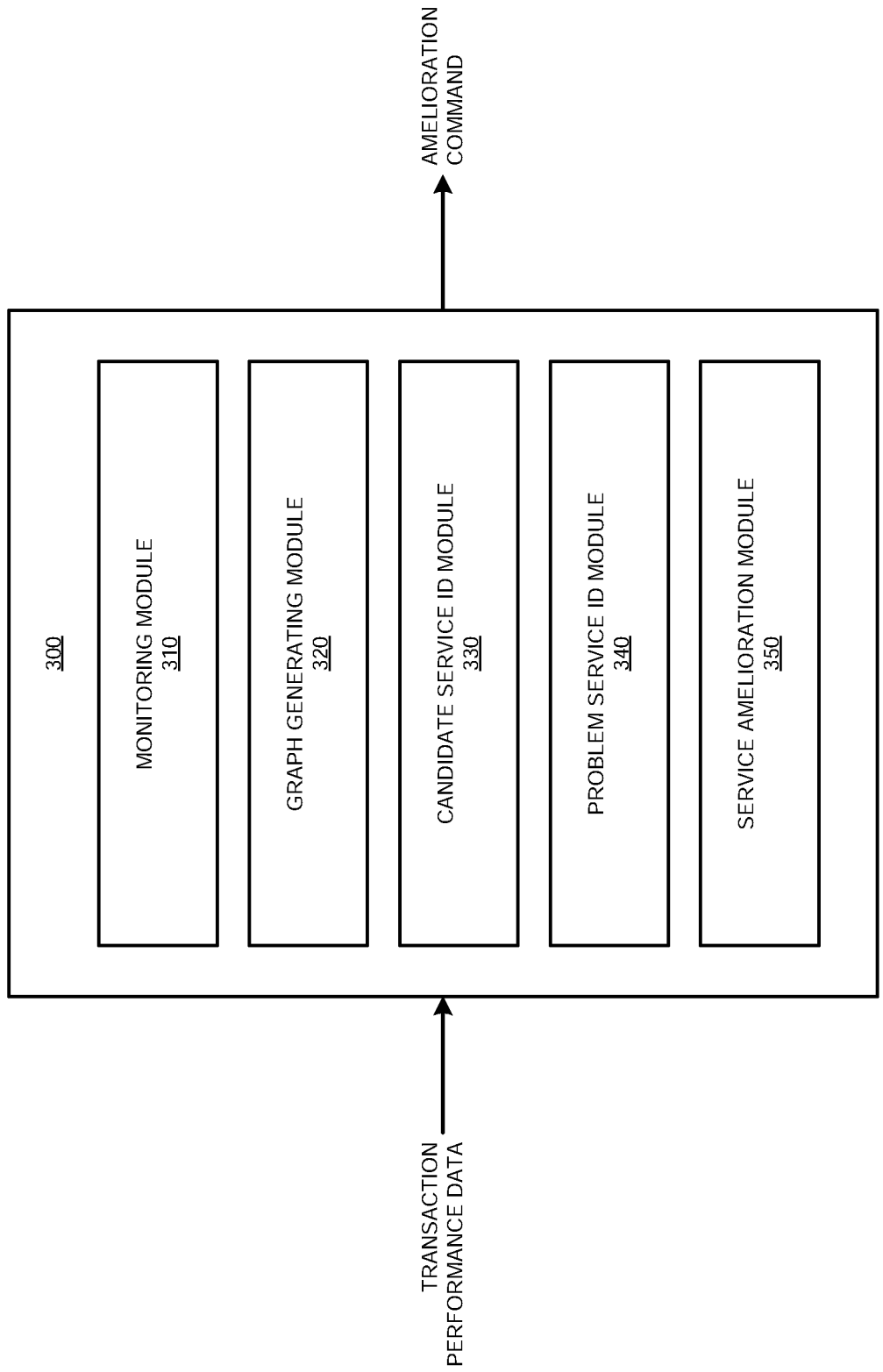
FIG. 3 depicts a block diagram of an example configuration for service issue source identification in an interconnected environment in accordance with an illustrative embodiment.

With reference to FIG. 3, this figure depicts a block diagram of an example configuration for service issue source identification in an interconnected environment in accordance with an illustrative embodiment. Application 300 is an example of application 105 in FIG. 1 and executes in any of servers 104 and 106, clients 110, 112, and 114, and device 132 in FIG. 1.

Monitoring module 310 detects that a service is exhibiting a symptom, a performance indicator with a value outside a predetermined range. One implementation of module 310 monitors a set of performance indicators of one or more executing services and the systems on which services execute, and generates an alert when one or more of the monitored performance indicators is outside a predetermined normal range. Another implementation of module 310 generates an alert when one or more of the monitored performance indicators is outside a predetermined normal range for more than a predetermined amount of time, to avoid generating spurious alerts if a performance indicator is only briefly outside the normal range. Another implementation of module 310 receives an alert from a separate performance monitoring application that monitors a set of performance indicators of services and systems and generates an alert when one or more of the monitored performance indicators is outside a predetermined normal range. In one implementation of module 310, the set of performance indicators includes only an error rate and latency time of a service. Another embodiment groups multiple performance indicators together into an error rate group or a latency group by normalizing individual performance indicator values to a common scale and combining them using an average, weighted average, or other presently available combining technique.

Graph generating module 320 constructs a graph representing data flow between a set of services including the service exhibiting the symptom. Each node of the graph represents a service, and edges of the graph represent a data flow between two services. One implementation of module 320 constructs a graph based on observed data flow during a single transaction, for example a transaction that was occurring when the embodiment detected the symptom. Another implementation of module 320 constructs a graph based on observed data flow during multiple transactions, for example including a transaction that was occurring when the embodiment detected the symptom. Another implementation of module 320 models data flow between the set of services using a topology other than a graph, or using a different data representation. Techniques for constructing the graph or other representation using observed data flows within a network are presently available.

Candidate service identification module 330 constructs a set of one or more candidate services, which are services that might be causing the original detected symptom. To construct a set of one or more candidate services, one implementation of module 330 traverses the graph or other data flow representation. At each service the implementation encounters during traversal (e.g., each node of the graph), the implementation determines from one or more performance indicators of the service, whether or not this service is also exhibiting a performance indicator with a value outside a predetermined range. If so, the implementation adds the service to the set of candidate services, and sets a flag corresponding to each abnormal performance indicator in a data structure of each candidate service. One implementation of module 330 traverses the graph using a breadth first search technique, starting from the service exhibiting the symptom and proceeding until encountering a node without that particular symptom. Other implementation of module 330 use other traversal techniques, which are presently known.

Module 330 also evaluates a probability of a cause corresponding to a symptom exhibited at a candidate service. One implementation of module 330 evaluates a probability of a cause corresponding to a symptom exhibited at every candidate service. To perform the evaluation, one implementation of module 330 uses a BBN, constructed using a combination of subject domain knowledge and historical data of the services on the network. In one implementation of module 330, a human expert selects nodes of the BBN, and module 330 learns the corresponding probabilities by analyzing historical data of the services and their network. Another implementation of module 330 analyzes historical data of the services and their network to determine both nodes and probabilities. Techniques for analyzing historical data to determine nodes, probabilities, or both are presently available. One implementation of module 330 uses a BBN with nodes representing error rate, latency, changes in application code or service configuration, saturation, traffic, and a dependency problem. Each node has two possible values, true and false, indicating whether or not a phenomenon represented by a node is currently occurring, and module 330 evaluates a probability of one node's variable being true, given values of one or more other nodes.

Module 330 uses the identified symptoms and any cause probabilities to identify one or more candidate services which could be the source of the original detected symptom. One implementation of module 330 identifies the set of candidate services, along with their symptoms and cause probabilities, for a human expert to use to perform further analysis. Another implementation of module 330 ranks the set of candidate services according to a probability of being the problem service, and presents the ranking, along with their symptoms and cause probabilities, to a human expert.

Problem service identification module 340 uses the ranked set of candidate services Another embodiment ranks the set of candidate services according to a probability of being the problem service, and selects a service as the problem service without input from a human expert.

Problem service identification module 340 ranks the set of candidate services according to a probability of being the problem service, and selects a service as the problem service without input from a human expert. One implementation of module 340 applies a set of heuristics or other logical reasoning to the set of candidate services, their symptoms, and cause probabilities to select the problem service.

Service amelioration module 350 reconfigures the problem service, ameliorating the cause of the detected symptom. Another implementation of application 300 does not include module 350; instead, module 340 reports the problem service to a human expert for verification and amelioration.

Figure 4:
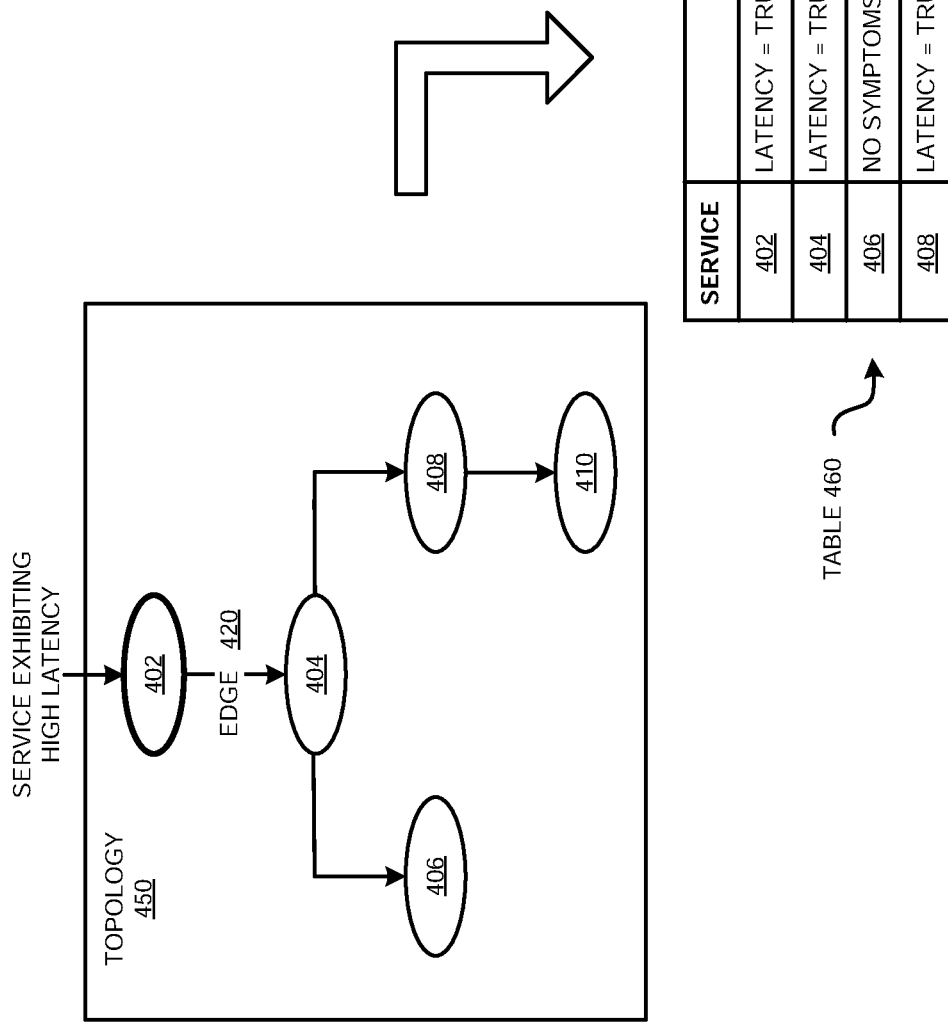
FIG. 4 depicts an example of service issue source identification in an interconnected environment in accordance with an illustrative embodiment.

With reference to FIG. 4, this figure depicts an example of service issue source identification in an interconnected environment in accordance with an illustrative embodiment. The example can be executed using application 300 in FIG. 3.

In particular, assume service 402 processes transactions in a first-in-first-out (FIFO) queue. In some of these transactions, service 402 fetches some work from the queue, then makes a call to service 404. Service 404 receives the call, performs some validations on it, and requests data from a database executing in service 408. While waiting for the data from service 408, service 404 blocks the requesting thread, then once the data is received service 404 responds to the original request from service 402. Because service 408 is a database server, it receives calls from other services, such as service 416.

At the time depicted, application 300 has detected that service 402 is exhibiting a higher-than-threshold latency, and constructed topology 450, a graph representing data flow between services 402 404, 406, 408, and 410. Each node of the graph represents a service, and edges of the graph represent a data flow between two services. Thus, edge 420 represents a data flow between services 402 and 404.

To construct a set of candidate services, application 300 traverses topology 450 starting with service 402, the service with the observed latency problem. At each service application 300 encounters during traversal (i.e., each node of the graph), application 300 determines from one or more performance indicators of the service, whether or not this service is also exhibiting a performance indicator with a value outside a predetermined range. If so, application 300 adds the service to the set of candidate services, and sets a flag corresponding to each abnormal performance indicator in a data structure of each candidate service. The results are depicted in table 460, in which each service has a flag set corresponding to each abnormal performance indicator. For example, the latency flag is set for service 402, but service 402 has no other flags set. Service 406 has no symptoms, hence no flags are set. Service 404 has latency and saturation flags set, but not the traffic flag.

Figure 5:
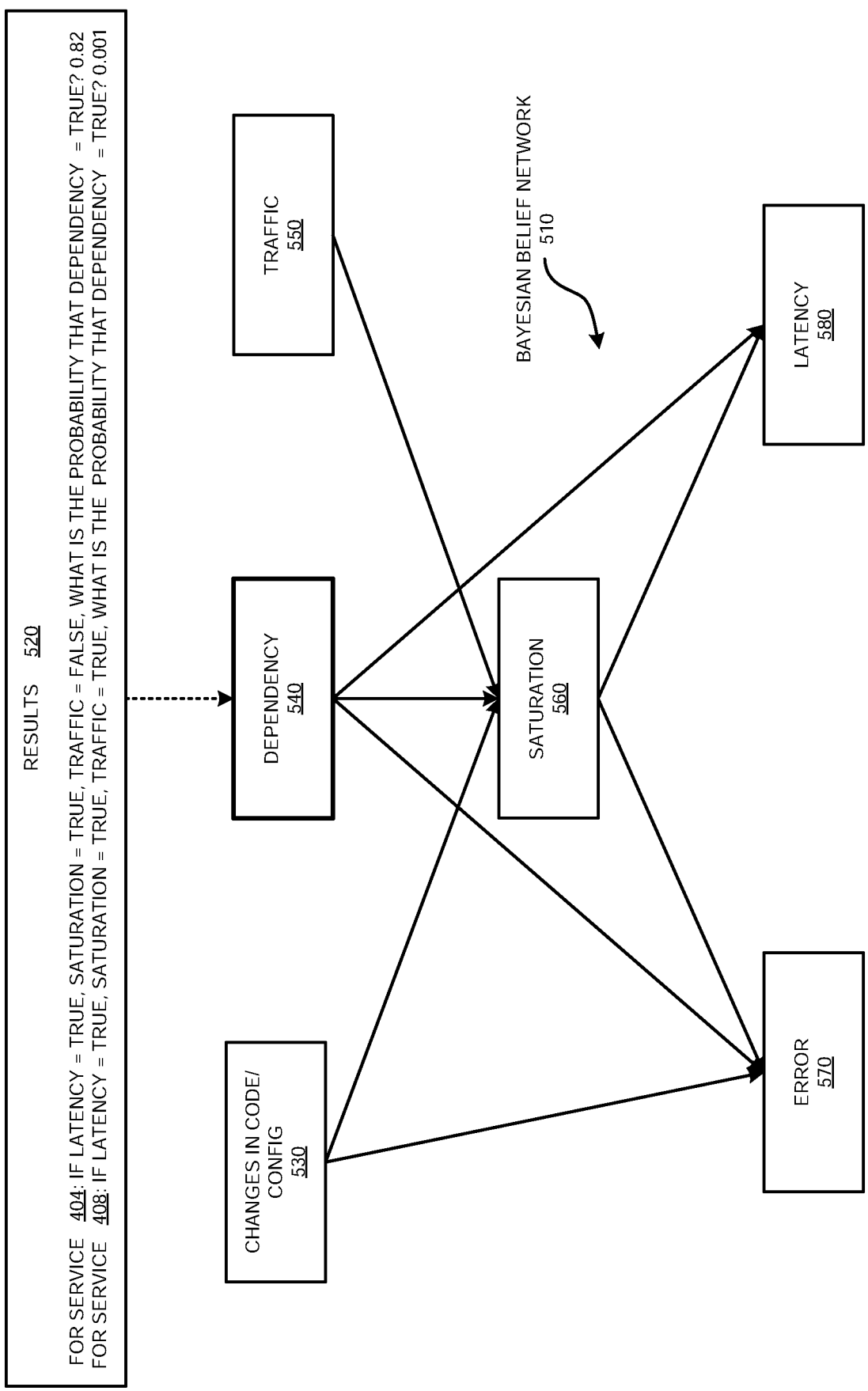
FIG. 5 depicts a continued example of service issue source identification in an interconnected environment in accordance with an illustrative embodiment.

With reference to FIG. 5, this figure depicts a continued example of service issue source identification in an interconnected environment in accordance with an illustrative embodiment. The example can be executed using application 300 in FIG. 3.

FIG. 5 depicts Bayesian Belief Network 510, constructed based on topology 450 in FIG. 4. Edges in BBN 510 represent conditional dependencies. Each node has a corresponding a probability function that takes, as input, a set of values of the node's parent variables, and computes a probability of the variable represented by the node given the input set of values. Here, BBN 510 has nodes 530, 540, 55, 560, 570, and 580, representing changes in application code or service configuration, a dependency problem, traffic, saturation, error rate, and latency respectively.

Application 300 uses BBN 510 to generate results 520. In particular, for service 404, which has latency=true, saturation=true, and traffic=false, application 300 uses BBN 510 to compute a probability that, given these inputs, service 404 has a dependency problem causing the observed symptoms. Here, that probability is 82%. Similarly, for service 408, which has latency=true, saturation=true, and traffic=true, application 300 uses BBN 510 to compute a probability that, given these inputs, service 408 has a dependency problem causing the observed symptoms. Here, that probability is 0.1%.

With reference to FIG. 6, this figure depicts a continued example of service issue source identification in an interconnected environment in accordance with an illustrative embodiment. Services 402, 404, 406, 408, and 410, edge 420, topology 450, and table 460 are the same as services 402, 404, 406, 408, and 410, edge 420, topology 450, and table 460 in FIG. 4.

As depicted, table 460 has been updated with results 520 from FIG. 5. Using the data in table 460, application 300 has identified services 402, 404, and 408 as possible sources of the problem at service 402. In particular, while service 402 is only exhibiting a latency problem, services 406 and 408 are exhibiting a latency problem and a saturation problem. Both services 404 and 408 are downstream in the topology from service 402, so that service 402's problem could be caused by any of services 402, 404, and 408.

Application 300 then applies a set of heuristics or other logical reasoning to the set of candidate services, their symptoms, and cause probabilities—all accumulated in table 460—to select the problem service. For example, services 402, 404, and 408 are each exhibiting at least one symptom. From topology 450, application 400 has determined that service 404 is dependent on service 402, and service 404 is dependent on service 408. Additionally, from BBN 510 application 300 has determined that there is an 82% probability that, given its symptoms, service 404 has a dependency problem and thus an 18% probability that service 404's problem is not due to a dependency and hence due to itself. As well, from BBN 510 application 300 has determined that there is a 0.1% probability that, given its symptoms, service 408 has a dependency problem, and thus a 99.9% probability that service 408's problem is due to itself. Because service 402 has only symptoms, not causes, service 402 cannot be the source of the problem. Thus, by ranking the probabilities of services 404 and 408 being the source of the problem, application 300 determines that within this set of candidate services, the root cause of the issue is likely to be at service 408. Application 300 then reconfigures service 408, ameliorating the problem.

Figure 7:
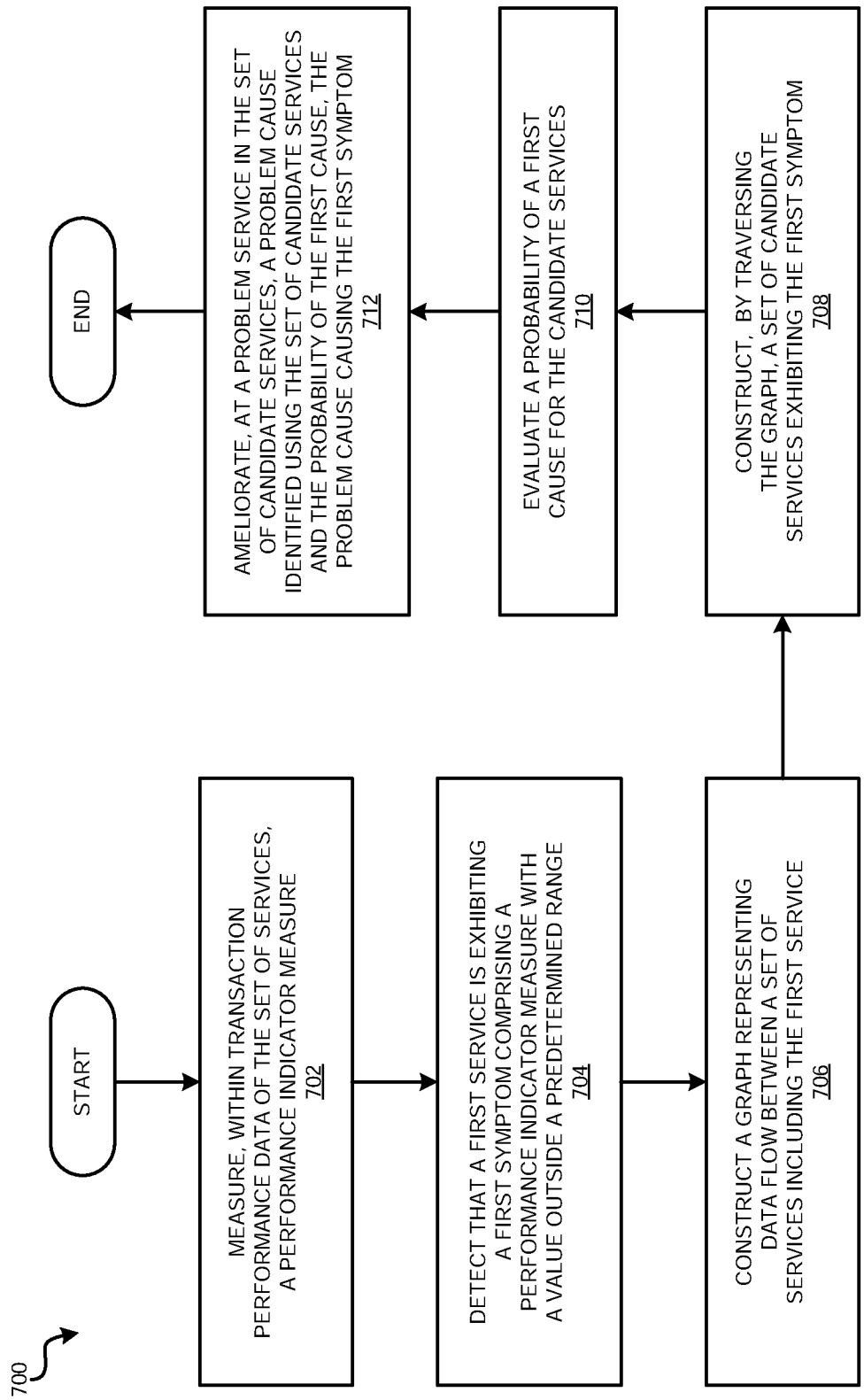
FIG. 7 depicts a flowchart of an example process for service issue source identification in an interconnected environment in accordance with an illustrative embodiment.

With reference to FIG. 7, this figure depicts a flowchart of an example process for service issue source identification in an interconnected environment in accordance with an illustrative embodiment. Process 800 can be implemented in application 300 in FIG. 3.

In block 702, the application measures, within transaction performance data of the set of services, a performance indicator measure. In block 704, the application detects that a first service is exhibiting a first symptom comprising a performance indicator measure with a value outside a predetermined range. In block 706, the application constructs a graph representing data flow between a set of services including the first service. In block 708, the application constructs, by traversing the graph, a set of candidate services exhibiting the first symptom. In block 710, the application evaluates a probability of a first cause for the candidate services. In block 712, the application ameliorates, at a problem service in the set of candidate services, a problem cause identified using the set of candidate services and the probability of the first cause, the problem cause causing the first symptom. Then the application ends.

Figure 8:
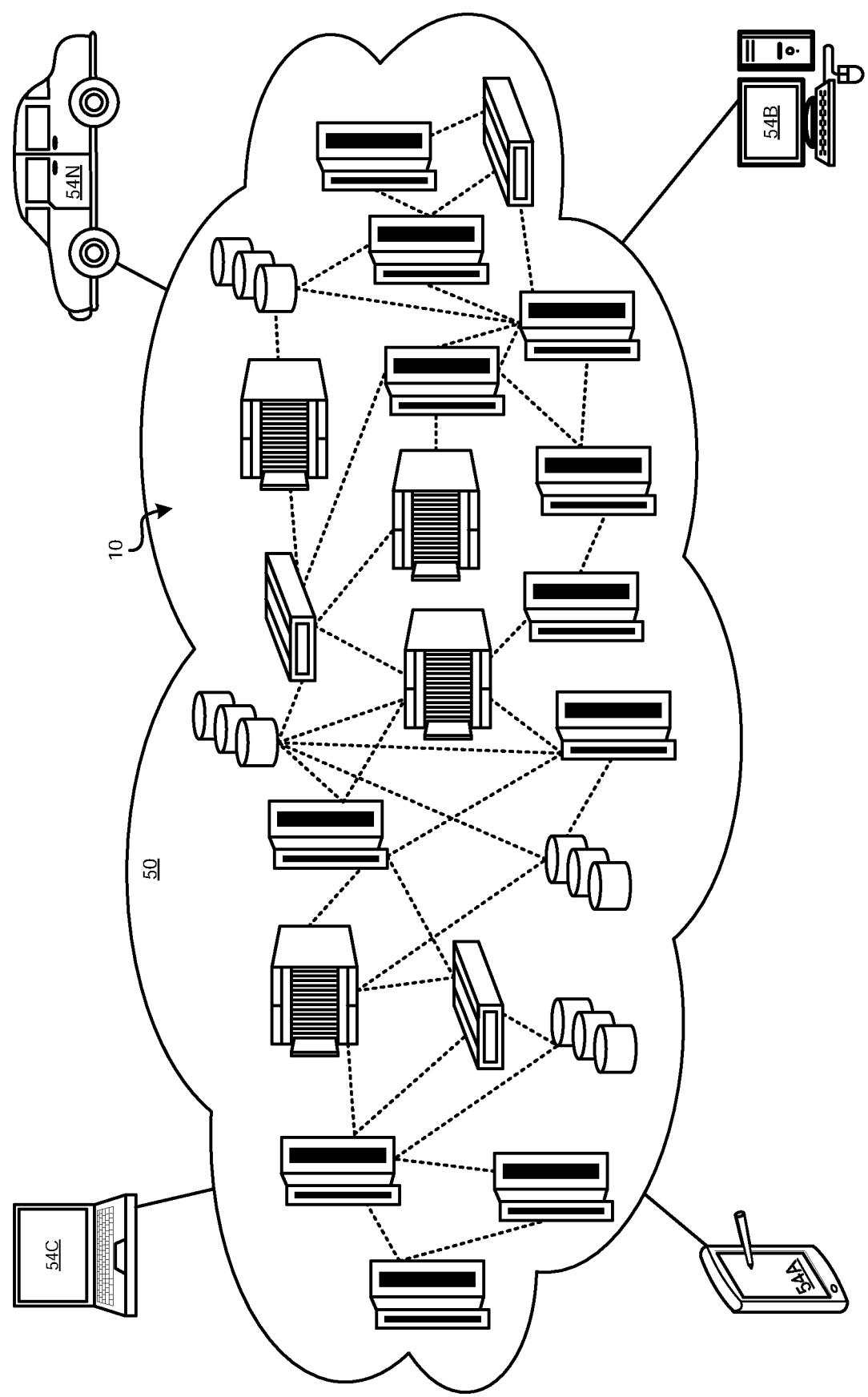
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
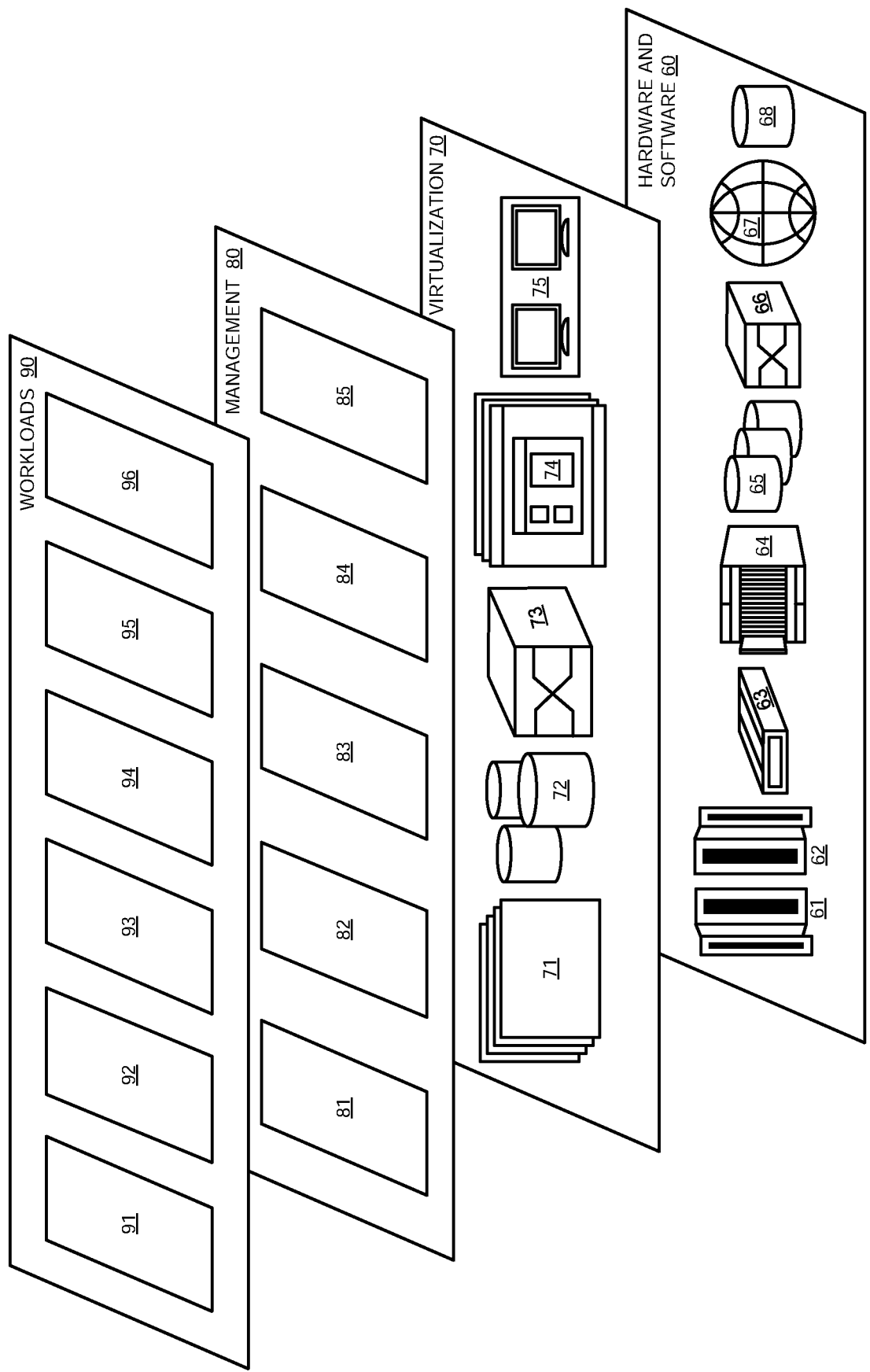
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for service issue source identification in an interconnected environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   detecting that a first service in a set of services is exhibiting a first symptom, the first symptom comprising a performance indicator measure with a value outside a predetermined range, each service in the set of services comprising a software application executing a set of transactions;
   constructing a graph representing data flow between the set of services including the first service, each node of the graph representing a service in the set of services, each edge of the graph representing an observed data flow of transaction data between two services in the set of services during execution of the set of transactions;
   constructing, by traversing the graph, a set of candidate services, a candidate service in the set of candidate services comprising a service exhibiting the first symptom, the set of candidate services including the first service;
   evaluating, for the candidate service, a probability of a first cause, the evaluating performed by setting a set of input variables of a Bayesian Belief Network (BBN) to binary values corresponding to the first symptom and computing, using the BBN, the probability of the first cause given the binary values of the set of input variables; and
   ameliorating, at a problem service in the set of candidate services, a problem cause, the problem service identified using the set of candidate services and the probability of the first cause, the problem cause causing the first symptom.

2. The computer-implemented method of claim 1, further comprising:
   measuring, within transaction performance data of the set of services, the performance indicator measure.

3. The computer-implemented method of claim 1, wherein the graph is constructed based on data flow observed between the set of services while processing a single transaction in the set of transactions.

4. The computer-implemented method of claim 1, wherein the graph is constructed based on data flow observed between the set of services while processing the set of transactions.

5. The computer-implemented method of claim 1, wherein the set of input variables of the Bayesian Belief Network comprise an error rate variable, a latency variable, a change variable, a saturation variable, a traffic variable, and a dependency variable.

6. The computer-implemented method of claim 1, wherein the problem service is different from the first service.

7. A computer program product for service issue source identification, the computer program product comprising:
   one or more computer readable storage media, and program instructions collectively stored on the one or more computer readable storage media, the program instructions comprising:
   program instructions to detect that a first service in a set of services is exhibiting a first symptom, the first symptom comprising a performance indicator measure with a value outside a predetermined range, each service in the set of services comprising a software application executing a set of transactions;
   program instructions to construct a graph representing data flow between the set of services including the first service, each node of the graph representing a service in the set of services, each edge of the graph representing an observed data flow of transaction data between two services in the set of services during execution of the set of transactions;
   program instructions to construct, by traversing the graph, a set of candidate services, a candidate service in the set of candidate services comprising a service exhibiting the first symptom, the set of candidate services including the first service;
   program instructions to evaluate, for the candidate service, a probability of a first cause the evaluating performed by setting a set of input variables of a Bayesian Belief Network (BBN) to binary values corresponding to the first symptom and computing, using the BBN, the probability of the first cause given the binary values of the set of input variables; and
   program instructions to ameliorate, at a problem service in the set of candidate services, a problem cause, the problem service identified using the set of candidate services and the probability of the first cause, the problem cause causing the first symptom.

8. The computer program product of claim 7, further comprising:
   program instructions to measure, within transaction performance data of the set of services, the performance indicator measure.

9. The computer program product of claim 7, wherein the graph is constructed based on data flow observed between the set of services while processing a single transaction in the set of transactions.

10. The computer program product of claim 7, wherein the graph is constructed based on data flow observed between the set of services while processing the set of transactions.

11. The computer program product of claim 7, wherein the set of input variables of the Bayesian Belief Network comprise an error rate variable, a latency variable, a change variable, a saturation variable, a traffic variable, and a dependency variable.

12. The computer program product of claim 7, wherein the problem service is different from the first service.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to detect that a first service in a set of services is exhibiting a first symptom, the first symptom comprising a performance indicator measure with a value outside a predetermined range, each service in the set of services comprising a software application executing a set of transactions;

program instructions to construct a graph representing data flow between the set of services including the first service, each node of the graph representing a service in the set of services, each edge of the graph representing an observed data flow of transaction data between two services in the set of services during execution of the set of transactions;

program instructions to construct, by traversing the graph, a set of candidate services, a candidate service in the set of candidate services comprising a service exhibiting the first symptom, the set of candidate services including the first service;

program instructions to evaluate, for the candidate service, a probability of a first cause the evaluating performed by setting a set of input variables of a Bayesian Belief Network (BBN) to binary values corresponding to the first symptom and computing, using the BBN, the probability of the first cause given the binary values of the set of input variables; and program instructions to ameliorate, at a problem service in the set of candidate services, a problem cause, the problem service identified using the set of candidate services and the probability of the first cause, the problem cause causing the first symptom.

17. The computer system of claim 16, further comprising:

program instructions to measure, within transaction performance data of the set of services, the performance indicator measure.

18. The computer system of claim 16, wherein the graph is constructed based on data flow observed between the set of services while processing a single transaction in the set of transactions.

19. The computer system of claim 16, wherein the graph is constructed based on data flow observed between the set of services while processing the set of transactions.

20. The computer system of claim 16, wherein the set of input variables of the Bayesian Belief Network comprise an error rate variable, a latency variable, a change variable, a saturation variable, a traffic variable, and a dependency variable.

* * * * *